(12) United States Patent
Wu

(10) Patent No.: US 9,137,764 B2
(45) Date of Patent: Sep. 15, 2015

(54) METHOD OF MANAGING TIMING ALIGNMENT FUNCTIONALITY FOR MULTIPLE COMPONENT CARRIERS AND RELATED COMMUNICATION DEVICE

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 268 days.

(21) Appl. No.: 12/721,515

(22) Filed: Mar. 10, 2010

(65) Prior Publication Data

US 2010/0238908 A1  Sep. 23, 2010

Related U.S. Application Data

(60) Provisional application No. 61/160,715, filed on Mar. 17, 2009.

(51) Int. Cl.
*H04J 3/06* (2006.01)
*H04W 4/00* (2009.01)
*H04W 56/00* (2009.01)

(52) U.S. Cl.
CPC .................. *H04W 56/0005* (2013.01)

(58) Field of Classification Search
USPC .......... 370/336, 345, 350, 503, 514; 375/357, 375/365; 455/502
See application file for complete search history.

(56) References Cited

U.S. PATENT DOCUMENTS

| | | | |
|---|---|---|---|
| 6,707,867 B2 * | 3/2004 | Diepstraten et al. | 375/354 |
| 7,289,578 B2 * | 10/2007 | Diepstraten et al. | 375/316 |
| 2006/0280142 A1 * | 12/2006 | Damnjanovic et al. | 370/329 |
| 2008/0037467 A1 * | 2/2008 | Diepstraten et al. | 370/330 |
| 2008/0137606 A1 | 6/2008 | Zuniga | |
| 2008/0233964 A1 * | 9/2008 | McCoy et al. | 455/450 |
| 2008/0267126 A1 | 10/2008 | Vujcic | |
| 2008/0273517 A1 | 11/2008 | Nishio | |
| 2008/0310395 A1 | 12/2008 | Kashima | |
| 2009/0304100 A1 * | 12/2009 | Brehler et al. | 375/260 |
| 2010/0080155 A1 * | 4/2010 | Suzuki et al. | 370/310 |
| 2010/0118720 A1 * | 5/2010 | Gauvreau et al. | 370/252 |
| 2010/0118752 A1 * | 5/2010 | Suzuki et al. | 370/311 |
| 2010/0197230 A1 * | 8/2010 | Charles et al. | 455/63.1 |
| 2010/0232340 A1 * | 9/2010 | Godor et al. | 370/312 |
| 2011/0235620 A1 * | 9/2011 | Ahn et al. | 370/336 |
| 2012/0033647 A1 * | 2/2012 | Moon et al. | 370/336 |

FOREIGN PATENT DOCUMENTS

| | | |
|---|---|---|
| CN | 1756094 A | 4/2006 |
| CN | 101167283 A | 4/2008 |

(Continued)

OTHER PUBLICATIONS

R2-091971 3GPP TSG-RAN2 Meeting #65 "Miscellaneous corrections and clarifications resulting from ASN.1 review", Feb. 2009.

(Continued)

*Primary Examiner* — Alpus H Hsu
(74) *Attorney, Agent, or Firm* — Winston Hsu; Scott Margo

(57) ABSTRACT

A method of managing timing alignment (TA) functionality in multiple component carriers for a communication device of a wireless communication system, which includes separately managing TA functionality of a plurality of component carriers or jointly managing TA functionality of component carriers belonging to the same cell.

4 Claims, 6 Drawing Sheets

(56) References Cited

FOREIGN PATENT DOCUMENTS

| CN | 101296451 A | 10/2008 | | |
|---|---|---|---|---|
| EP | 1821429 A2 | * | 8/2007 | ............... H04B 7/26 |
| EP | 1 871 035 A1 | 12/2007 | | |
| WO | 2007108630 A1 | 9/2007 | | |

OTHER PUBLICATIONS

3GPP TR 36.814 V0.3.2 3rd Generation Partnership Project; Technical Specification Group Radio Access Network; Further Advancements for E-UTRA Physical Layer Aspects (Release X), Jan. 2009.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.7.0, Dec. 2008, p. 1-144.
Office action mailed on Apr. 6, 2012 for the China application No. 201010149593.X, filed Mar. 17, 2010, p. 1-5.
Qualcomm:"Reply LS on RAN2 status on carrier aggregation", 3GPP TSG RAN WG2 Meeting #67bis, R2-095422, Oct. 12, 2009.
RAN2: "LS on RAN2 status on carrier aggregation design", 3GPP TSG-RAN WG2 meeting #66, R2-093599, May 4, 2009.
Panasonic: "TA command clarification as the result of RAN4 decision", 3GPP TSG-RAN WG1 Meeting 56, R1-090676, Feb. 9, 2009.
Office action mailed on Jan. 10, 2014 for the Taiwan application No. 099107786, filing date Mar. 17, 2010, p. 1-4.
3GPP TS 36.213 V8.5.0 (Dec. 2008), "3rd Generation Partnership Project; Technical Specification Group Radio Access Netwok; Evolved Universal Terrestrial Radio Access (E-UTRA); Physical layer procedures (Release 8)", pp. 1-74.
3GPP TS 36.321 V8.4.0 (Dec. 2008), "3rd Generation Partnership Project; Technical Specification Group Radio Access Network; Evolved Universal Terrestrial Radio Access (E-UTRA) Medium Access Control (MAC) protocol specification (Release 8)", pp. 1-43.
3GPP2 C.S0024-B v2.0 "cdma2000 High Rate Packet Data Air Interface Specification" (Feb. 2012).
Office action mailed on Jul. 19, 2013 for the Taiwan application No. 099107786, filing date Mar. 17, 2010, pp. 1-4.
Office action mailed on Jun. 10, 2015 for the Taiwan application No. 103110158, filed Mar. 17, 2010, p. 1-7.

* cited by examiner

METHOD OF MANAGING TIMING ALIGNMENT FUNCTIONALITY FOR MULTIPLE COMPONENT CARRIERS AND RELATED COMMUNICATION DEVICE

CROSS REFERENCE TO RELATED APPLICATIONS

This application claims the benefit of U.S. Provisional Application No. 61/160,715, filed on Mar. 17, 2009 and entitled "Method for handling TA update in multiple connections in a wireless communication system and related apparatus" the contents of which are incorporated herein.

BACKGROUND OF THE INVENTION

1. Field of the Invention

A method utilized in a wireless communication system and communication device thereof are provided, and more particularly, to a method of managing timing alignment functionality for multiple component carriers in a wireless communication system and related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, so that the system structure becomes simple.

According to structure of the LTE system, timing alignment (TA) functionality allows a user equipment (UE) with a component carrier to be synchronized with a serving base station on uplink timing for preventing signals transmitted from the UE from colliding with those sent from other UEs under the coverage of the base station. In the TA functionality, the UE has to maintain a time alignment timer whose running state indicates that uplink transmission is still synchronized. The network can control the TA functionality of the UE with a timing advance command. Detailed operation of the TA functionality can be referred in related specifications, and is not given herein.

Toward advanced high-speed wireless communication system, such as transmitting data in a higher peak data rate, LTE-Advanced is standardized by the 3rd Generation Partnership Project (3GPP) as an enhancement of LTE system. LTE-Advanced targets faster switching between power states, improves performance at the cell edge, and includes subjects, such as bandwidth extension, coordinated multi-point transmission/reception (COMP), uplink multiple input multiple output (MIMO) extension up to 4×4, downlink MIMO extension up to 4×4, relaying, and etc.

Based on a concept of bandwidth extension, carrier aggregation is introduced to the LTE-Advanced for extension to wider bandwidth, where two or more component carriers are aggregated, for supporting wider transmission bandwidths e.g. up to 100MHz and for spectrum aggregation. According to carrier aggregation capability, multiple component carriers are aggregated into overall wider bandwidth, wherein a UE can establish multiple links corresponding to the multiple component carriers for simultaneously receiving and/or transmitting on each component carrier. Each component carrier includes a hybrid automatic repeat request (HARQ) entity and a transport block.

However, in the LTE system, each UE is only allowed to use a single component carrier, so the UE maintains synchronization with a base station during TA functionality performance only on the single component carrier. Furthermore, the UE is allowed to connect to multiple component carriers according to the LTE Advancement. However, the LTE Advancement does not clearly specify how the TA functionality is applied in the UE with multiple component carriers. The management of TA functionality for the multiple component carriers is never concerned. Improper configuration on TA functionality with multiple component carriers causes failure of UE synchronization and uplink transmission.

The applicant provides an uplink transmission problem as below based on a direct image on a basis of a combination of the prior art LTE and LTE-Advanced system. Consider a scenario that a UE in a RRC (Radio Resource Control) connected mode is configured with two component carriers for uplink transmission from two cells and the UE maintains a time alignment timer for uplink synchronization as specified in the LTE system. The two cells have different timing advance values for the UE. According to the prior art, the UE updates the timing advance according to a received timing advance command. When the UE applies the timing advance to the uplink transmission for both component carriers, the uplink transmission in one component carrier will be successful, but the uplink transmission in the other component carrier will be failed because the timing advance value is correct in the component carrier, but is not correct in the other component carrier.

SUMMARY OF THE INVENTION

Therefore, a method of managing timing alignment (TA) functionality in multiple component carriers for a wireless communication system and related communication device are provided.

A method of managing TA functionality in multiple component carriers for a communication device of a wireless communication system is provided. The method includes separately managing TA functionality of a plurality of component carriers.

A communication device for managing TA functionality in multiple component carriers for a wireless communication system is further provided. The communication device includes a plurality of TA executing units for executing TA functionality of a plurality of component carriers, and a management unit for separately managing the TA functionality of the plurality of component carriers A method of managing TA functionality in multiple component carriers for a communication device of a wireless communication system is further provided. The method includes jointly managing TA functionality of a plurality of component carriers belonging to a cell.

A communication device for managing TA functionality in multiple component carriers for a wireless communication system is further provided. The communication device includes a plurality of TA executing unit for executing TA functionality of a plurality of component carriers belonging to a cell, and a management unit for jointly managing the TA functionality of the plurality of component carriers belonging to the cell.

These and other objectives will no doubt become obvious to those of ordinary skill in the art after reading the following detailed description of the preferred example that is illustrated in the various figures and drawings.

DETAILED DESCRIPTION

Figure 1:
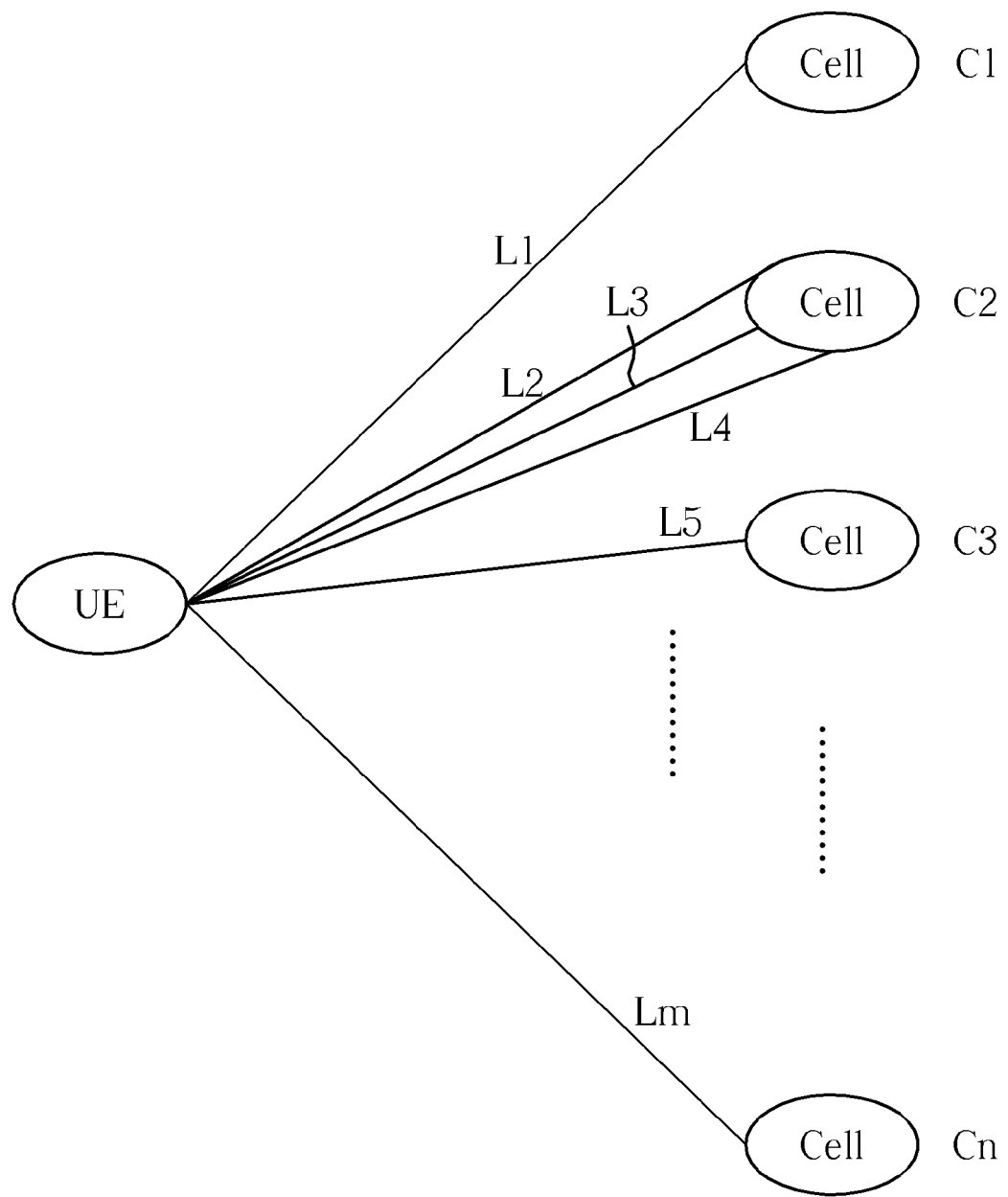
FIG. 1 is a schematic diagram of a wireless communication system with multiple component carriers.

Please refer to FIG. 1, which illustrates a schematic diagram of connections between a UE and cells C1-Cn in a wireless communication system. In FIG. 1, the cells C1-Cn and the UE are communicated through links L1-Lm each corresponding to a component carrier configured in the UE, and each supports a LTE-Advanced radio access technology (RAT) or an E-UTRAN (Evolved Universal Terrestrial Radio Access Network) RAT supporting the function of multiple component carriers on one UE. For example, the UE is communicated with the cell C1 through the link L1, communicated with the cell C2 through the links L2-L4, and so on. The component carriers of the links can be the same component carrier frequency band if the component carriers are associated to different cells. For example, the component carrier of any of the links L2-L4 can use the same frequency band as the component carrier of the link L1.

Figure 2:
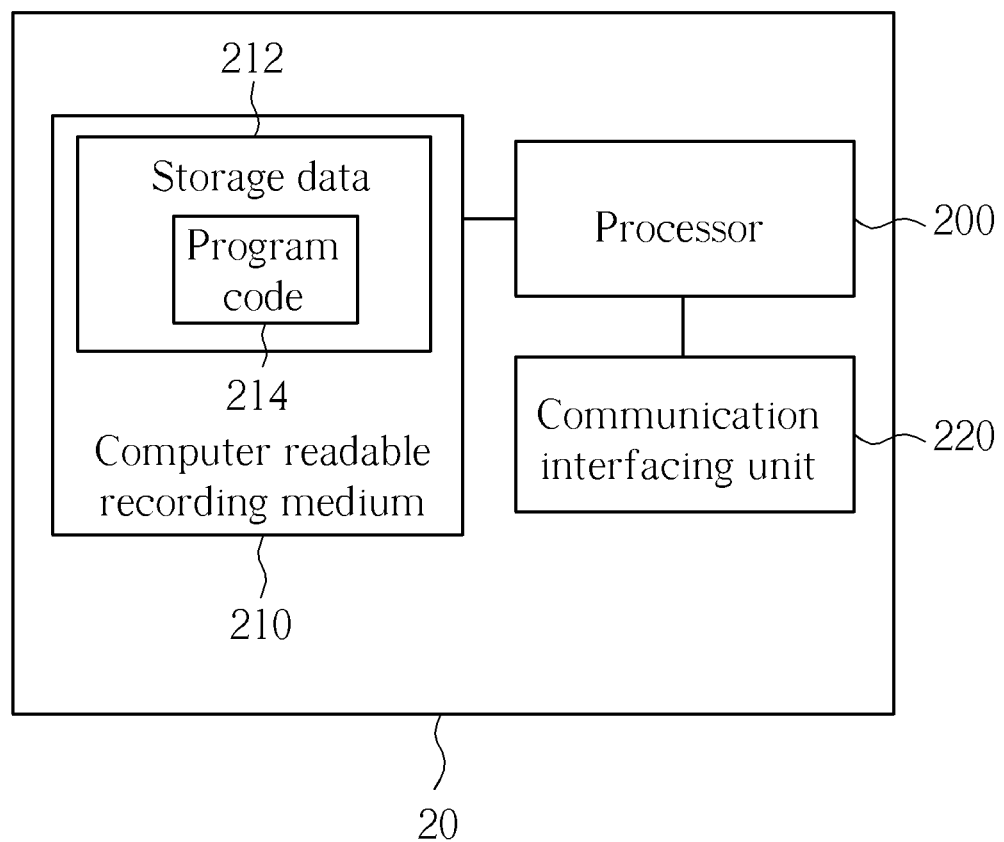
FIG. 2 is a schematic diagram of an exemplary communication device.

Please refer to FIG. 2, which illustrates a schematic diagram of an exemplary communication device 20. The communication device 20 can be the UE shown in FIG. 1 and includes a processor 200 such as a microprocessor or ASIC, a computer readable recording medium 210, and a communication interfacing unit 220. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver and accordingly exchanges wireless signals with a network (i.e. the cells C1-Cn) according to processing results of the processor 200.

Figure 3:
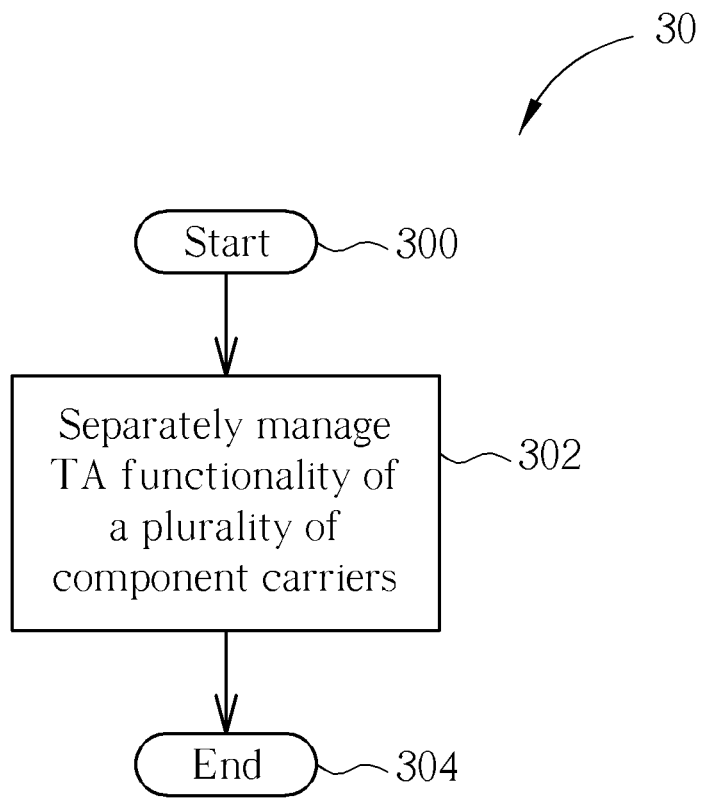
FIG. 3 is a flowchart of an exemplary process.

The program code 214 includes program code of a Medium Access Control (MAC) layer which can manage timing alignment (TA) functionality for multiple component carriers. Please refer to FIG. 3, which illustrates a flowchart of an exemplary process 30. The process 30 is utilized in the UE for managing TA functionality with multiple component carriers in a wireless communication system. The process 30 can be compiled into the program code 214 and includes the following steps:

Step 300: Start.

Step 302: Separately manage TA functionality of a plurality of component carriers.

Step 304: End.

According to the process 30, the UE manages TA functionality of each of the plurality of component carriers with independent TA configuration sets can be configured by timing advance command sent by the network. That is, when a timing advance command is received from a link belonging to a component carrier, the UE applies the TA functionality for the component carrier only. In one example, no limitation on carrier-to-cell allocation is introduced. The component carriers belonging to the same or different cells are depended on network resource allocation.

Take an example associated with FIG. 1. If a UE has a first link (i.e. link L1) belonging to a first component carrier and a second link (i.e. link L2) belonging to a second component carrier for uplink transmission, the UE applies the TA functionality for the first component carrier when a first timing advance command is received in the first component carrier, applies the TA functionality for the second component carrier when a second timing advance command is received in the second component carrier, and so on.

For TA functionality operation, when the TA functionality is applied in a component carrier for updating a timing advance value corresponding to a cell, the UE starts or restarts a time alignment timer for the component carrier. For example, as abovementioned, when the TA functionality is applied in the first component carrier for updating a first timing advance value corresponding to a cell (i.e. cell C1), the UE starts or restarts a first time alignment timer for the first component carrier according to the first timing advance command. Please note that, the abovementioned time alignment timer of the UE is utilized for indicating whether the UE is synchronized with the cell on uplink timing. When the time alignment timer is running, uplink timing is considered synchronized. If the time alignment timer expires, then this indicates that the UE no longer has uplink synchronization with the cell. Therefore, when the first time alignment timer expires, the UE releases resources of Channel Quality Indication (CQI) report, Sounding Reference Signal (SRS), scheduling request (SR), and Physical Uplink Control Channel (PUCCH) for the first component carrier. Similarly, when the TA functionality is applied in the second component carrier, the UE starts or restarts a second time alignment timer for the second component carrier according to the second timing advance command, and releases resources of CQI report, SRS, SR, and PUCCH for the second component carrier when the second time alignment timer expires. In the LTE-Advanced system, the released CQI-report, SRS, SR, and PUCCH resources can be CQI-ReportConfig, soundingRS-UL-Config, schedulingRequestConfig and pucch-Config configurations, respectively.

In addition, for network configuration flexibility and reduction of a signaling quantity, a Radio Resource Control (RRC) message can be used to indicate the usage of the following timing advance command(s). When a RRC message indicating one component carrier is received, the UE applies TA functionality for the indicated component carrier when a timing advance command is received in the indicated component carrier.

Alternatively, when the RRC message indicating more than one component carrier is received, the UE applies the TA functionality for each of the indicated component carriers when the timing advance command is received in any one of the indicated component carriers. Take an example associated with FIG. 1. If the RRC message indicates component carriers corresponding to the links L2-L4, the UE applies the TA functionality for each of the TA configuration sets corresponding to the links L2-L4 when the timing advance command is received in any one of the links L2-L4. Please note that the abovementioned TA functionality applying is not against with the separate management concept of the process 30. The UE still sets the TA functionality of the component carriers one by one although the configuration source, namely timing advance command, is come from one link.

Figure 4:
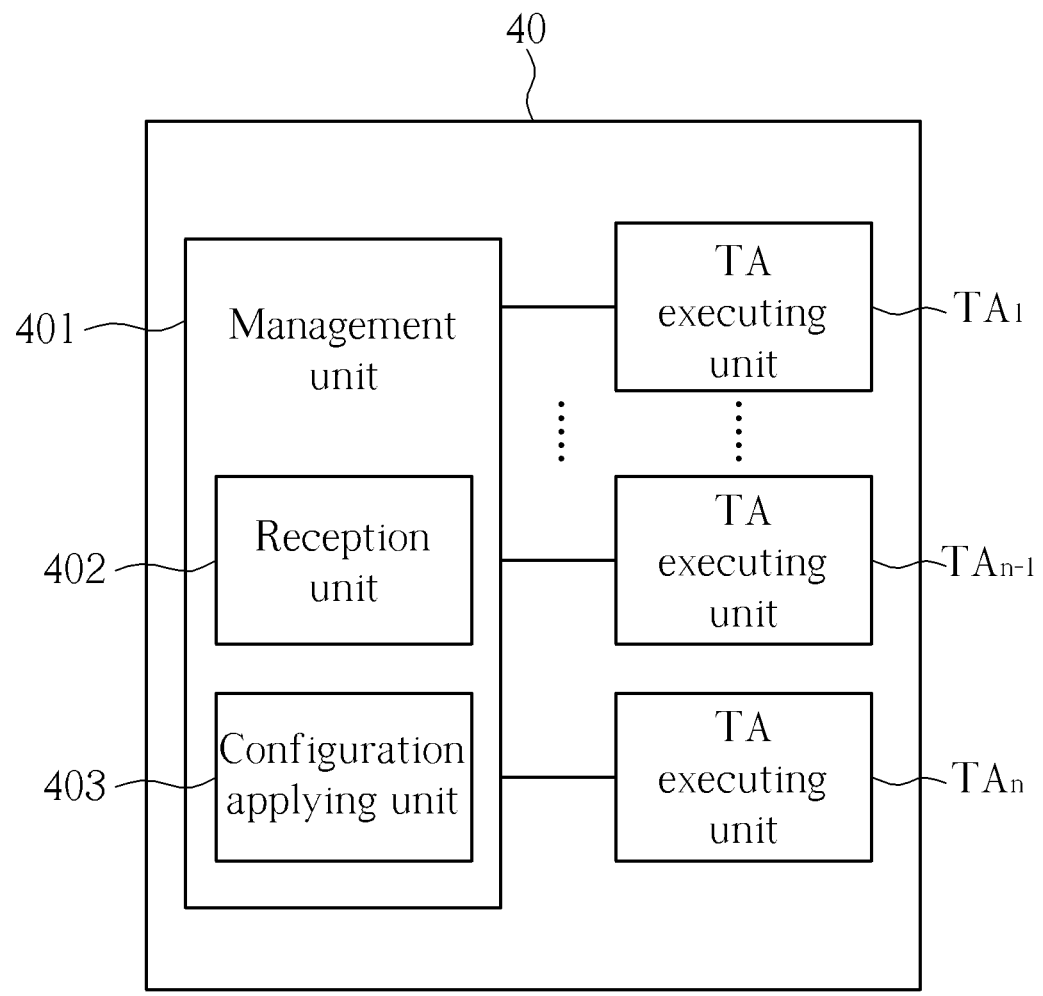
FIG. 4 is a schematic diagram of an exemplary communication device according to FIG. 3.

Please refer to FIG. 4 which is a schematic diagram of an exemplary communication device 40. The communication device 40 is used for realizing the process 30 and includes TA executing units $TA_1$-$TA_n$ and a management unit 401. The TA executing units $TA_1$-$TA_n$ are used for executing TA functionality (e.g. resource releasing or time advance applying) of component carriers of the communication device 40 and each of the TA executing units TA$_1$-TA$_n$ is responsible for one component carrier. The management unit 401 is used for separately managing the TA functionality of the component carriers. The management unit 401 includes a reception unit 402 for receiving a timing advance command, and a configuration applying unit 403. In an example, when the reception unit 402 receives a timing advance command from one of the component carriers. The configuration applying unit 403 then applies the TA functionality for the component carriers received the timing advance command, and starts or restarts a time alignment timer for this component carrier according to the received timing advance command. In addition, the reception unit 402 is further used for receiving a RRC message for indicating at least one of the component carriers. The configuration applying unit 403 applies the TA functionality for the indicated component carriers when the timing advance command is received in one of the indicated component carriers, and starts or restarts a time alignment timer for all of the indicated component carriers. The related description can be realized by referring to the above, so a detailed description is omitted herein.

Figure 5:
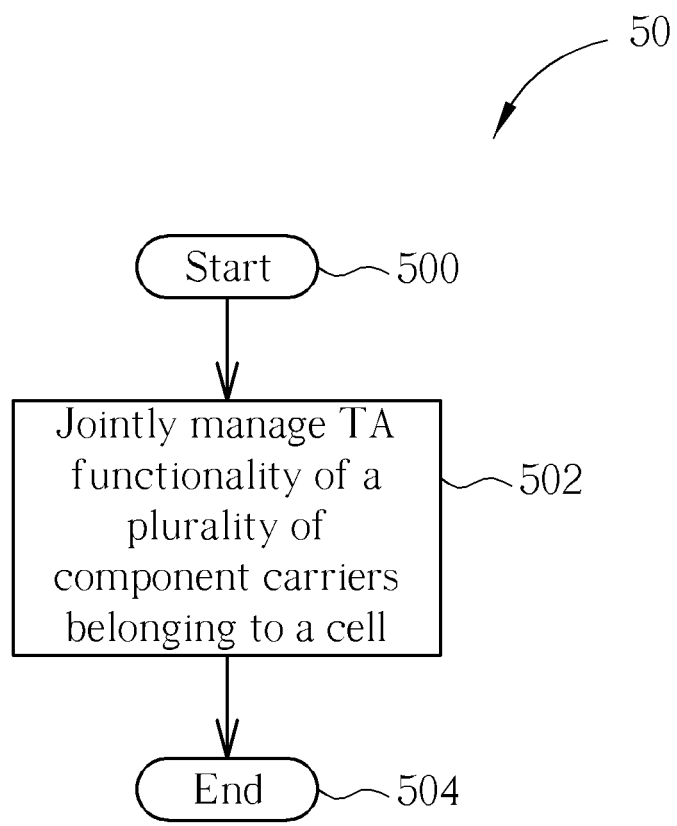
FIG. 5 is a flowchart of an exemplary process.

On the other hand, for reducing a configuration signaling quantity or complexity of TA functionality operation, please refer to FIG. 5 which is a flowchart of an exemplary process 50. The process 50 is utilized in the UE for managing the TA functionality with multiple component carriers in a wireless communication system. The process 50 can be compiled into the program code 214 and includes the following steps:

Step 500: Start.

Step 502: jointly manage TA functionality of a plurality of component carriers belonging to a cell.

Step 504: End.

According to the process 50, the UE manages the TA functionality in the plurality of component carriers belonging to the same cell with a common timing advance command. That is, when a timing advance command is received in one of the component carriers belonging to a cell, the UE jointly applies the TA functionality for the component carriers belonging to the cell.

Take an example according to FIG. 1. When a timing advance command is received in any one of the links L2-L4 belonging to the cell C2, the UE applies the TA functionality for the links L2-L4 according to the timing advance command. In this situation, the network does not need to generate and send timing advance command duplications for the links L2-L4, and on the other hand, the UE does not need to handle the TA functionality for each component carrier belonging to the same cell. As a result, the signaling quantity is reduced and furthermore complexity problem of separately configuring each component carrier is avoided.

For TA functionality operation, when the TA functionality is applied in the plurality of component carriers belonging to the same cell for updating a timing advance value corresponding to the cell, the UE starts or restarts a time alignment timer for those component carriers according to the timing advance command. Therefore, when the time alignment timer expires, the UE releases resources of CQI report, sounding RS, scheduling request, and PUCCH for all component carriers belonging to the cell. As a result, according to the abovementioned example, the UE starts or restarts a time alignment timer for the links L2-L4, and releases resources of the links L2-L4 when the time alignment timer expires.

Based on the process 50, the UE applies the TA functionality and maintains one time alignment timer for certain component carriers belonging to the same cell through a single timing advance command, so as to reduce the number of times for the timing advance command reception and related signalling quantity.

Figure 6:
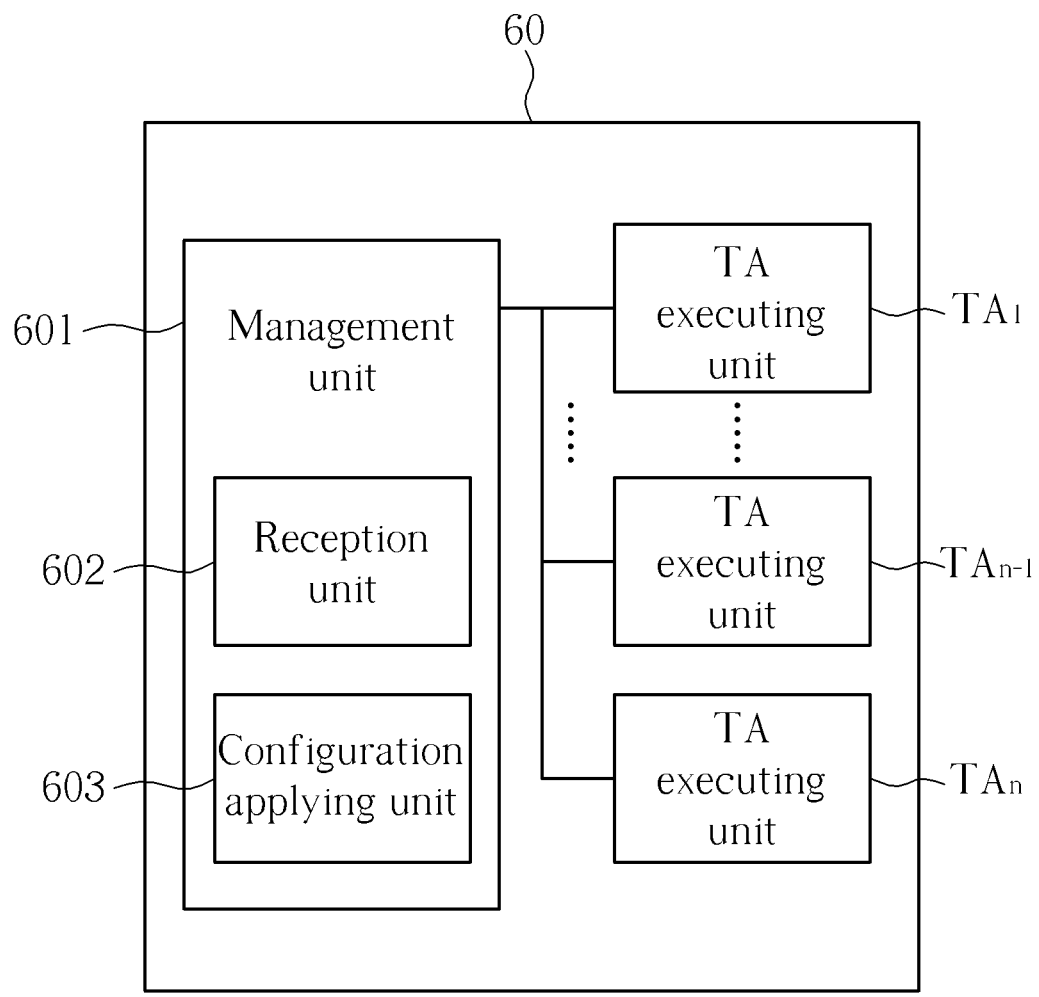
FIG. 6 is a schematic diagram of an exemplary communication device according to FIG. 5.

Please refer to FIG. 6 which is a schematic diagram of an exemplary communication device 60. The communication device 60 can be used for realizing the process 40, which includes a plurality of TA executing unit TA$_1$-TA$_n$ for executing TA functionality of component carriers belonging to a cell, and a management unit 601 for jointly managing the TA functionality of the component carriers. The management unit 601 includes a reception unit 602 for receiving a timing advance command, and a configuration applying unit 603. When the reception unit 602 receives a timing advance command in one of the component carriers belonging to a cell, the configuration applying unit 603 applies the TA functionality for at least a component carriers belonging to the cell. In addition, the configuration applying unit 603 starts or restarts a time alignment timer for the component carriers belonging to the cell according to the timing advance command. Detailed description can be referred from above, so the detailed description is omitted herein.

Please note that the abovementioned steps of the processes 30 and 50 including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the above-mentioned examples provide a separately managing way to manage the TA functionality for multiple component carriers to avoid an erroneous situation where one component carrier belonging to a cell is successful in uplink synchronization while other component carriers belonging to other cells are failed. Furthermore, the other examples provide a jointly managing way for component carriers belonging to the same cell in order to reduce a signaling quantity or complexity of TA functionality operation.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of managing timing alignment, TA, functionality for a communication device of a wireless communication system which supports carrier aggregation that multiple component carriers are aggregated to support wider transmission bandwidth, the method comprising:

receiving a radio resource control, RRC, message indicating a usage of a timing advance command for at least one of a plurality of component carriers configured to the communication device, from a cell in a network of the wireless communication system;

when the timing advance command has been received from the cell in the network for all of the indicated at least one component carrier, applying the timing advance functionality corresponding to the cell for all of the indicated at least one component carrier, for updating a same timing advance value corresponding to the cell for all of the indicated at least one component carrier; and when updating the timing advance value, starting or restarting a time alignment timer for all of the indicated at least one component carrier.

2. The method of claim 1 further comprising:

releasing resources of channel quality indication report, sounding reference signal, scheduling request and Physical Uplink Control Channel, PUCCH, for the corresponding component carrier, when the time alignment timer expires.

3. A method of managing timing alignment, TA, functionality for a cell in a network of a wireless communication system which supports carrier aggregation that multiple component carriers are aggregated to support wider transmission bandwidth, the method comprising:

transmitting, by the cell in the network, a radio resource control, RRC, message indicating a usage of a timing advance command for at least one of a plurality of component carriers configured to a communication device of the wireless communication system, to the communication device;

transmitting, by the cell in the network, the timing advance command for all of the at least one component carrier to the communication device, for updating a same timing advance value for all of the at least one component carrier; and when the communication device updates the timing advance value, the communication device starts or restarts a time alignment timer for all of the indicated at least one component carrier.

4. A communication device of a wireless communication system which supports carrier aggregation that multiple component carriers are aggregated to support wider transmission bandwidth for managing timing alignment, TA, functionality, the communication device comprising:

a non-transitory computer-readable medium for storing program code corresponding to a process; and a processor coupled to the non-transitory computer-readable medium, for processing the program code to execute the process, wherein the process comprises:

receiving a radio resource control, RRC, message indicating a usage of a timing advance command for at least one of a plurality of component carriers configured to the communication device, from a cell in a network of the wireless communication system;

when the timing advance command has been received from the cell in the network for all of the indicated at least one component carrier, applying the timing advance functionality corresponding to the cell for all of the indicated at least one component carrier, for updating a same timing advance value corresponding to the cell for all of the indicated at least one component carrier; and when updating the timing advance value, starting or restarting a time alignment timer for all of the indicated at least one component carrier.

* * * * *